United States Patent
Minokuchi et al.

(10) Patent No.: US 10,856,354 B2
(45) Date of Patent: Dec. 1, 2020

(54) RADIO COMMUNICATION SYSTEM, NETWORK DEVICE, AND RADIO COMMUNICATION METHOD

(71) Applicant: NTT DOCOMO, INC., Tokyo (JP)

(72) Inventors: Atsushi Minokuchi, Tokyo (JP); Jari Mutikainen, Munich (DE); Irfan Ali, Istanbul (TR)

(73) Assignee: NTT DOCOMO, INC., Tokyo (JP)

( * ) Notice: Subject to any disclaimer, the term of this patent is extended or adjusted under 35 U.S.C. 154(b) by 18 days.

(21) Appl. No.: 16/339,750

(22) PCT Filed: Oct. 6, 2017

(86) PCT No.: PCT/JP2017/036521
§ 371 (c)(1),
(2) Date: Apr. 5, 2019

(87) PCT Pub. No.: WO2018/066702
PCT Pub. Date: Apr. 12, 2018

(65) Prior Publication Data
US 2020/0053814 A1    Feb. 13, 2020

(30) Foreign Application Priority Data
Oct. 7, 2016  (JP) ................................. 2016-199102

(51) Int. Cl.
*H04L 12/801* (2013.01)
*H04L 12/851* (2013.01)
(Continued)

(52) U.S. Cl.
CPC .......... *H04W 76/22* (2018.02); *H04W 28/10* (2013.01); *H04W 76/11* (2018.02); *H04W 76/15* (2018.02); *H04W 84/20* (2013.01)

(58) Field of Classification Search
CPC ..... H04W 76/22; H04W 76/15; H04W 76/11; H04W 28/10; H04W 84/20; H04W 92/045; H04W 92/12; H04W 76/25
See application file for complete search history.

(56) References Cited

U.S. PATENT DOCUMENTS 6,801,508 B1 * 10/2004 Lim .................... H04L 12/5601
370/310.1
10,757,636 B2 * 8/2020 Starsinic ............... H04W 48/16
(Continued)

FOREIGN PATENT DOCUMENTS

| WO | 2015/115606 A1 | 8/2015 |
| WO | 2015/115629 A1 | 8/2015 |
| WO | 2015/136122 A1 | 9/2015 |

OTHER PUBLICATIONS

Extended European Search Report issued in counterpart European Patent Application No. 17858538.6, dated Apr. 7, 2020 (6 pages).
(Continued)

*Primary Examiner* — Faruk Hamza
*Assistant Examiner* — Abusayeed M Haque
(74) *Attorney, Agent, or Firm* — Osha Bergman Watanabe & Burton LLP

(57) ABSTRACT

A radio communication method includes a step in which a MeNB (210) transmits a bearer setup instruction to establish a bearer including a first tunnel and a second tunnel based on a setup request, and a step in which a CN-UP (300) establishes the first tunnel and the second tunnel based on the bearer setup instruction. The CN-UP (300) sets the same identifiers to a TEID on the CN-UP (300) side of the first tunnel and a TEID on the CN-UP (300) side of the second tunnel.

5 Claims, 11 Drawing Sheets

(51) Int. Cl.
*H04W 84/18* (2009.01)
*H04L 5/06* (2006.01)
*H04Q 11/04* (2006.01)
*H04W 76/22* (2018.01)
*H04W 76/15* (2018.01)
*H04W 76/11* (2018.01)
*H04W 28/10* (2009.01)
*H04W 84/20* (2009.01)

(56) References Cited

U.S. PATENT DOCUMENTS

| | | | | |
|---|---|---|---|---|
| 2002/0080757 | A1* | 6/2002 | Narvanen | H04L 12/2856 370/338 |
| 2010/0138661 | A1* | 6/2010 | Tsai | H04W 36/0038 713/171 |
| 2011/0141895 | A1* | 6/2011 | Zhang | H04L 12/66 370/235 |
| 2012/0202491 | A1* | 8/2012 | Fox | H04W 12/0013 455/435.1 |
| 2013/0021932 | A1* | 1/2013 | Damnjanovic | H04W 52/0229 370/252 |
| 2013/0170479 | A1* | 7/2013 | Fong | H04W 72/0446 370/336 |
| 2014/0044065 | A1* | 2/2014 | Agiwal | H04W 76/40 370/329 |
| 2016/0227439 | A1* | 8/2016 | Wang | H04W 28/085 |
| 2016/0337925 | A1 | 11/2016 | Fujishiro et al. | |
| 2017/0104717 | A1* | 4/2017 | Vesterinen | H04W 8/26 |
| 2017/0231018 | A1* | 8/2017 | Hahn | H04W 76/10 |
| 2017/0265175 | A1* | 9/2017 | Gandhi | H04W 76/20 |
| 2017/0303145 | A1* | 10/2017 | Yang | H04W 76/22 |
| 2018/0227837 | A1* | 8/2018 | Starsinic | H04W 48/16 |

OTHER PUBLICATIONS

International Search Report issued in PCT/JP2017/036521 dated Dec. 26, 2017 (2 pages).
Written Opinion of the International Searching Authority issued in PCT/JP2017/036521 dated Dec. 26, 2017 (4 pages).
International Preliminary Report on Patentability from PCT/JP2017/036521 dated Oct. 4, 2018 (7 pages).
Nokia, Alcatel-Lucent Shanghai Bell; "EPC-NR PDCP interaction for tight interworking: User Plane aspects"; 3GPP TSG-RAN WG2 Meeeting #95bis, R2-167037; Kaohsiung, Taiwan; Oct. 10-14, 2016 (7 pages).
ZTE, ZTE Microelectronics; "RAN Consideration on the impact of QoS on NR CP"; 3GPP TSG-RAN WG2 Meeting #95bis, R2-166335; Kaohsiung, Taiwan; Oct. 10-14, 2016 (6 pages).
NTT DOCOMO,INC.; "Reviewing the benefit of Flow based QoS"; 3GPP TSG-RAN2#95bis, R2-167111; Kaohsiung, Taiwan; Oct. 10-14, 2016 (3 pages).
3GPP TR 23.799 V1.0.2; "3rd Generation Partnership Project; Technical Specification Group Services and System Aspects; Study on Architecture for Next Generation System (Release 14)"; Sep. 2016 (423 pages).
3GPP TS 36300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).

* cited by examiner

FIG. 3

```
NGS Bearer @ Network = {    (S5 PGW TEID, S5 SGW TEID),           #single S5/S8 Tunnel
                            {(NG3 eNBTEIDx, NG3 SGW TEID)}        #one for each S1-U leg
                            { (FPI1, FPI2), (NG3 eNBTEIDx, NG3 SGW TEID) }    #leg 1, FPI1 and FPI2
                            { (FPI3),      (NG3 eNBTEIDy, NG3 SGW TEID) }    #leg 2, FPI 3
}
```

```
NGS Bearer @ UE = {    (DRB1, TFT1),     #leg 1, FPI1
                       (DRB2, TFT2),     #leg 1, FPI2
                       (DRB3, TFT3)      #leg 2, FPI3
}
```

RADIO COMMUNICATION SYSTEM, NETWORK DEVICE, AND RADIO COMMUNICATION METHOD

TECHNICAL FIELD

The present invention relates to a radio communication system which includes a master radio base station and a secondary radio base station, a network device, and a radio communication method.

BACKGROUND ART

3rd Generation Partnership Project (3GPP) specifies, with the aim of further speeding Long Term Evolution (LTE), LTE-Advanced (hereinbelow, the LTE includes the LTE-Advanced). The 3GPP is also discussing a specification for the new radio (NR) and the next generation system (NGS), which are called 5G (5th generation mobile communication system), for example.

In the discussion for a specification for this next generation system, there has been proposed the flow-based QoS (Quality of Service) framework (for example, Non-Patent Literature 1). Specifically, based on the Flow Priority Indicator (FPI) indicating a degree of priority of an IP flow, scheduling and priority control of the IP flow are performed on an EPS bearer (NGS bearer), which is a logical communication path established in the system.

In addition, in LTE, Dual Connectivity (DC) where user device (UE) performs communication via a Master Cell Group (MCG) and a Secondary Cell Group (SCG) is defined (for example, Non-Patent Literature 2). In the DC, tunnels (for example, GTP tunnels) are respectively established between an MeNB constituting the MCG and a network device (Serving Gateway (SGW)) on the core network, and between the SGW and an SeNB constituting the SCG. In the meantime, an EPS bearer using the established tunnel is established.

Specifically, regarding the connection of the NR to the core network, a configuration where one of the MeNB and the SeNB is connected to LTE and the other is connected to the NR has been discussed. In the case of connecting to the NextGen Core (NGC) network, a tunnel to a functional entity that provides a user plane called a CN-UP is established instead of a tunnel to the SGW.

PRIOR ART DOCUMENT

Non-Patent Document

Non-Patent Document 1: 3GPP TR 23.799 V1.0.2 Section 8.2 "Interim Agreements on Key Issue #2: QoS framework", 3rd Generation Partnership Project; Technical Specification Group Services and System Aspects; Study on Architecture for Next Generation System (Release 14), 3GPP, October 2016

Non-Patent Document 2: TS 36.300 V13.4.0 Section 6.5 "Dual Connectivity", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP, June 2016

SUMMARY OF THE INVENTION

When the flow-based QoS control is introduced, the QoS control is performed for every IP flows as described above. The EPS bearer includes a data radio bearer (DRB) and core network bearers (specifically, an S1 bearer and an S5/S8 bearer). Although the conventional bearer-based QoS control involves one-to-one correspondence between the data radio bearer and the core network bearers based on the QoS level, the flow-based QoS control does not involve such one-to-one correspondence.

Thus, for execution of the Dual Connectivity (DC), a network device on the core network, i.e., a functional entity providing a control plane called a CN-CP has a problem that there is no way to know whether to establish a PDN tunnel and a core network bearer (S1 bearer) between the SeNB and a functional entity providing a user plane called a CN-UP.

In the conventional bearer-based QoS control, since the one-to-one correspondence exists between the data radio bearer and the core network bearers, a network device (mobility management entity (MME)) is capable of knowing that a tunnel and a core network bearer (S1 bearer) should be established between the SeNB and the SGW for execution of the DC.

Even if the flow-based QoS control is introduced, the above-mentioned problem may be solved by just adding a sequence for the MeNB and the CN-CP to establish a tunnel and a core network bearer between the SeNB and the CN-UP, as a matter of course. However, this would complicate the sequence and necessitate changing the existing sequence drastically.

Hence, the present invention has been made in view of the above situation, and an objective thereof is to provide a radio communication system, a network device, and a radio communication method that can implement the Dual Connectivity (DC) without complicating the sequence even with the flow-based QoS control.

Means for Solving the Problems

A radio communication system according to an aspect of the present invention includes: a master radio base station configured to perform radio communications with user device and control radio communications between the user device and a secondary radio base station; and a network device configured to establish a bearer that includes a first tunnel to the master radio base station and a second tunnel to the secondary radio base station.

The master radio base station includes a bearer controller that receives a setup request of the bearer and, based on the setup request, transmits a bearer setup instruction to establish the bearer using the first tunnel and the second tunnel. The network device includes a tunnel setup section that establishes the first tunnel and the second tunnel based on the bearer setup instruction.

The tunnel setup section sets the same identifiers to a first tunnel endpoint identifier on a network device side of the first tunnel and a second tunnel endpoint identifier on a network device side of the second tunnel.

A network device according to an aspect of the present invention is configured to perform radio communications with user device and establish a bearer that includes a first tunnel to a master radio base station, which controls radio communications between the user device and a secondary radio base station, and a second tunnel to the secondary radio base station. The network device includes a tunnel setup section that establishes the first tunnel and the second tunnel based on a bearer setup instruction to establish the bearer using the first tunnel and the second tunnel. The tunnel setup section sets the same identifiers to a first tunnel endpoint identifier on a network device side of the first tunnel and a second tunnel endpoint identifier on a network device side of the second tunnel.

A radio communication method according to an aspect of the present invention is executed by using a master radio base station that performs radio communications with user device and controls radio communications between the user device and a secondary radio base station, and a network device that establishes a bearer that includes a first tunnel to the master radio base station and a second tunnel to the secondary radio base station. The radio communication method includes the steps of: receiving a setup request of the bearer and, based on the setup request, transmitting a bearer setup instruction to establish the bearer using the first tunnel and the second tunnel, by the master radio base station, and establishing the first tunnel and the second tunnel by the network device based on the bearer setup instruction. In the step of establishing the first tunnel and the second tunnel, the same identifiers are set to a first tunnel endpoint identifier on a network device side of the first tunnel and a second tunnel endpoint identifier on a network device side of the second tunnel.

BRIEF DESCRIPTION OF THE DRAWINGS

FIG. 3 is a diagram illustrating an example of showing a configuration of an EPS bearer (NGS bearer).

MODES FOR CARRYING OUT THE INVENTION

Next, an embodiment of the present invention will be described based on the drawings. Note that the same or similar reference signs denote the same or similar functions and structures, and descriptions thereof are omitted as appropriate.

(1) Overall Schematic Configuration of Radio Communication System

Figure 1:
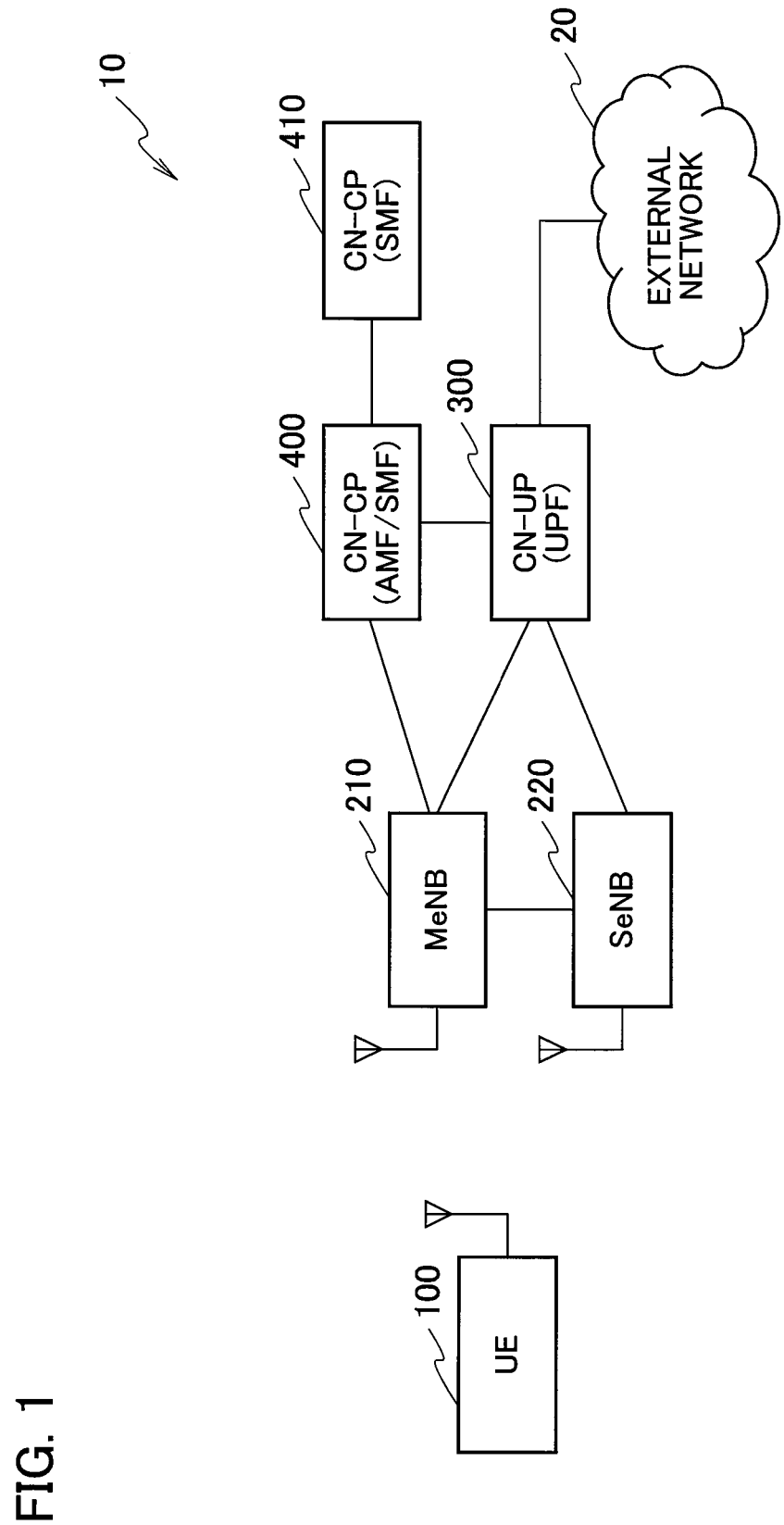
FIG. 1 is an overall schematic configuration diagram of a radio communication system 10.

FIG. 1 is an overall schematic configuration diagram of a radio communication system 10 according to the present embodiment. The radio communication system 10 conforms to "5G", which is the succeeding system of Long Term Evolution (LTE). Note that the radio communication system 10 may be referred to as FRA (future radio access), the next generation system (NGS), or the 5G system (5GS) for example.

As illustrated in FIG. 1, the radio communication system 10 includes user device 100 (hereinafter, UE 100), a master radio base station 210 (hereinafter, MeNB 210), a secondary radio base station 220 (hereinafter, SeNB 220), a core network user plane function 300 (hereinafter, CN-UP 300), and core network control plane functions 400, 410 (hereinafter, CN-CP 400, CN-CP 410).

The UE 100 performs radio communications with the MeNB 210 and the SeNB 220. Specifically, the UE 100 supports the Dual Connectivity (DC) defined in the 3rd Generation Partnership Project (3GPP). The UE 100 performs radio communications via a Master Cell Group (MCG), which is a group of cells formed by the MeNB 210, and a Secondary Cell Group (SCG), which is a group of cells formed by the SeNB 220. In addition, the MeNB 210 and the SeNB 220 construct a radio access network.

As described above, the MeNB 210 performs radio communications with the UE 100. In addition, the MeNB 210 controls radio communications between the UE 100 and the SeNB 220. The MeNB 210 is connected with the SeNB 220 via an X2 interface.

As described above, also the SeNB 220 performs radio communications with the UE 100. Specifically, the SeNB 220 performs radio communications with the UE 100 based on the control by the MeNB 210.

The CN-UP 300, CN-CP 400, and CN-CP 410 form the core network of the radio communication system 10. The CN-UP 300 is connected with the MeNB 210 and the SeNB 220 via S1 interfaces. Note that the CN-UP 300 may be called a User Plane Function.

In addition, the CN-CP 400 is connected with the MeNB 210 via an S1 interface. Note that the CN-CP 400 may be separated to an Access and Mobility Management Function (AMF) and a Session Management Function (SMF) and may be called an AMF/SMF.

The CN-UP 300 provides a user plane function of the radio communication system 10. In the present embodiment, the CN-UP 300 constitutes a network device. The CN-CP 400 and the CN-CP 410 provide a control plane function of the radio communication system 10.

In other words, in the core network of the radio communication system 10, a configuration (CUPS: C/U plane separation) is employed in which the control plane function for controlling the UE 100, the MeNB 210, the SeNB 220, and the like, and the user plane function for transmitting and receiving user data and the like are clearly separated.

The CN-CP 400 is provided in the visited network (VPLMN) of the UE 100. The CN-CP 410 is provided in the home network (HPLMN) of the UE 100. Note that the CN-CP 410 may be called a Session Management Function (SMF).

Each of the CN-UP 300 and CN-CPs 400, 410 may include a mobility management entity (MME), a Serving Gateway (SGW), a PDN gateway (PGW), a traffic detection function (TDF), and the like.

The CN-UP 300 is connected to an external network 20. Although a typical example of the external network 20 is the Internet, the type of the external network 20 is not particularly limited. The external network 20 may be a private network provided by the operator or the like of the radio communication system 10.

(2) Configuration of Bearers and Tunnels

Figure 2:
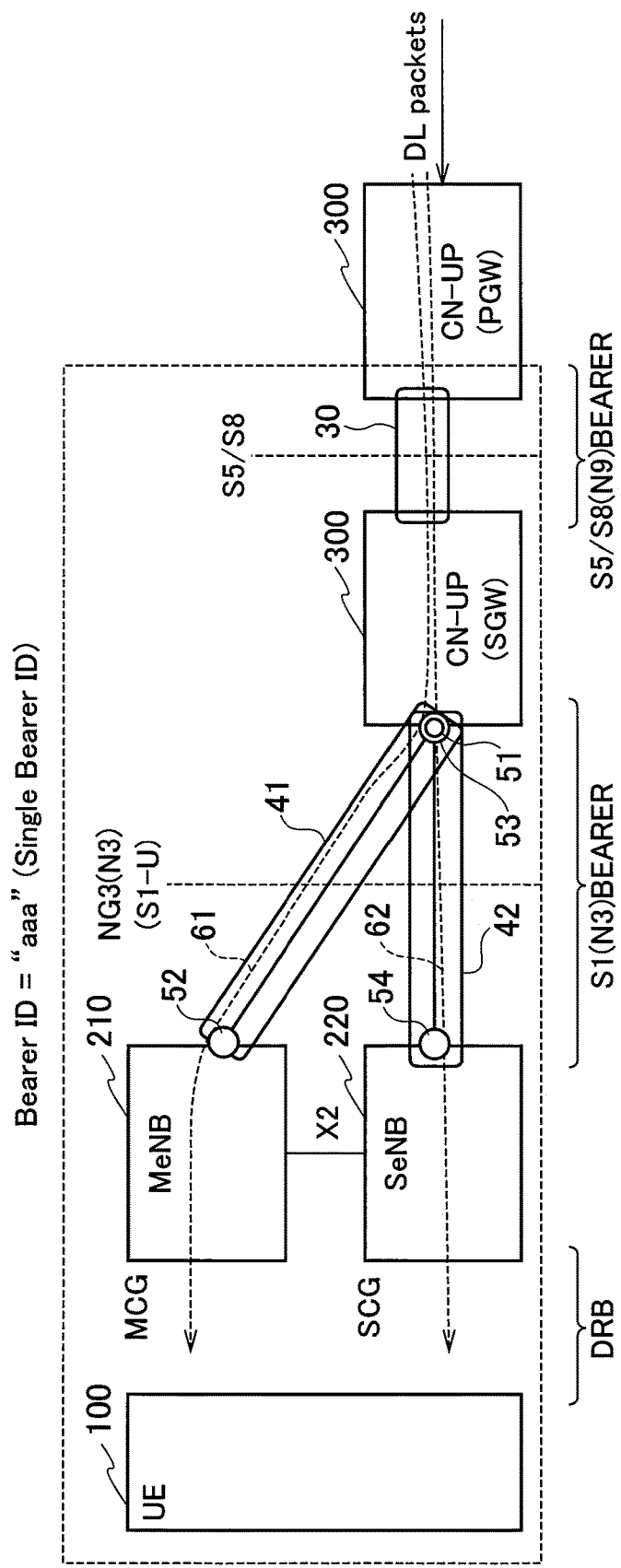
FIG. 2 is a diagram illustrating a configuration of bearers and tunnels established in the radio communication system 10.

FIG. 2 is a diagram illustrating a configuration of bearers and tunnels established in the radio communication system 10. As illustrated in FIG. 2, a PDN tunnel 30 is established between one CN-UP 300, which provides a function comparable to that of an SGW, and the other CN-UP 300, which provides a function comparable to that of a PGW (S5/S8 interface). Note that the S5/S8 interface may be called an N9 interface.

In the present embodiment, the PDN tunnel 30 is a tunnel conforming to the GPRS Tunneling Protocol (GTP), for example. An S5/S8 bearer is established between the CN-UP 300 (SGW) and the CN-UP 300 (PGW) by using the PDN tunnel 30.

A PDN tunnel 41 (first tunnel) is established between the MeNB 210 and the CN-UP 300 (SGW) (S1-U interface). In addition, a PDN tunnel 42 (second tunnel) is established between the SeNB 220 and the CN-UP 300 (SGW) (S1-U interface). Note that the S1-U interface may be called an NG3 interface. Noted that the S1-U interface may be called an N3 interface.

As with the PDN tunnel 30, the PDN tunnel 41 and the PDN tunnel 42 are also a tunnel conforming to the GTP. An S1 bearer is established between the MeNB 210 and the CN-UP 300 (SGW) by using the PDN tunnel 41. In addition, an S1 bearer is established between the SeNB 220 and the CN-UP 300 (SGW) by using the PDN tunnel 42.

At the PDN tunnel 41, a tunnel endpoint identifier 51 (hereinafter, TEID 51) and a tunnel endpoint identifier 52 (hereinafter, TEID 52) are set. The TEID 51 identifies an endpoint on the CN-UP 300 side of the PDN tunnel 41. The TEID 52 identifies an endpoint on the MeNB 210 side of the PDN tunnel 41.

Likewise, at the PDN tunnel 42, a TEID 53 and a TEID 54 are set. The TEID 53 identifies an endpoint on the CN-UP 300 side of the PDN tunnel 42. The TEID 54 identifies an endpoint on the SeNB 220 side of the PDN tunnel 42.

Although a unique identifier can be set to each of the TEID 51 to the TEID 54, the same identifiers (in the present embodiment, TEID=1 for the sake of convenience) are set to the TEID 51 and the TEID 53 in the present embodiment. Specifically, in the present embodiment, the same identifiers (TEID=1) are set to the TEID 51 (first tunnel endpoint identifier) on the CN-UP 300 (network device) side of the PDN tunnel 41 and the TEID 53 (second tunnel endpoint identifier) on the CN-UP 300 side of the PDN tunnel 42.

A unique identifier is set to each of the TEID 52 and the TEID 54. For example, TEID=x is set to the TEID 52, and TEID=y is set to the TEID 54.

In addition, data radio bearers (DRBs) are established between the UE 100 and the MeNB 210 and between the UE 100 and the SeNB 220, respectively. Specifically, an MCG bearer is established between the UE 100 and the MeNB 210, and an SCG bearer is established between the UE 100 and the SeNB 220.

The bearers (EPS bearer (NGS bearer)) established in the radio communication system 10 include the DRBs and core network bearers. Specifically, the core network bearers include the S1 bearers and the S5/S8 bearer. Note that the EPS bearer may be called the NGS bearer.

Although unique identifiers (Bearer ID) can be set to the DRBs and the core network bearers, in the present embodiment, the same identifiers are set to the DRBs and the core network bearers (here, Bearer ID=aaa for the sake of convenience). In other words, in the present embodiment, the single identifier (Bearer ID) is set to the bearers (EPS bearer). Note that the Bearer ID may be called a PDU session ID.

In the radio communication system 10, the above described EPS bearer, that is, the EPS bearer to which the same Bearer IDs are set is used for scheduling of multiple IP flows 61, 62. Specifically, the IP flows 61, 62 are transmitted via the EPS bearer.

In FIG. 2, IP flows in a downlink direction are illustrated. In the present embodiment, descriptions will be mainly provided for processing of IP flows in the downlink direction hereinafter.

Processing conforming to a protocol in the radio communication system 10 is performed on IP packets in the downlink direction (DL packets) arrived at the CN-UP 300 via the external network 20, and thus-processed IP packets are transmitted as IP flows.

The type of the IP flow 61 and the type of the IP flow 62 are different. Specifically, the degree of priority of dealing with the IP flow 61 in the radio communication system 10 and the degree of priority of dealing with the IP flow 62 in the radio communication system 10 are different. In other words, in the radio communication system 10, the priority control using a flow priority identifier (FPI), which indicates a degree of priority of an IP flow transmitted via the EPS bearer is performed. Noted that the FPI may be called a QoS Flow Identity (QFI).

Specifically, different FPIs are assigned respectively to the IP flow 61 and the IP flow 62. Here, FPI=1 with the high priority is assigned to the IP flow 61, while FPI=2 with the lower priority than that of FPI=1 is assigned to the IP flow 62.

In the CN-UPs 300, the IP flow 61 (FPI=1) is scheduled, or routed, to the PDN tunnel 41 based on the control by the MeNB 210 and the CN-CP 400. In the meantime, in the CN-UPs 300, the IP flow 62 (FPI=2) is routed to the PDN tunnel 42.

FIG. 3 is a diagram illustrating an example of showing a configuration of the EPS bearer (NGS bearer). Specifically, FIG. 3 illustrates the configuration of the EPS bearer (NGS bearer) to which a single Bearer ID is set as illustrated in FIG. 2. In the example in FIG. 3, three FPIs (FPI1, FPI2, FPI3) with different degrees of priority are defined. Note that the EPS bearer (NGS bearer) may be called a PDU session.

As illustrated in FIG. 3, the NGS bearer has two NG3 tunnels (corresponding to the PDN tunnels 41, 42 illustrated in FIG. 2) (see the parts indicated with #leg 1, leg 2 in FIG. 3). In addition, the same identifiers (for example, TEID=1 as described above) are set to NG3 SGW TEIDs (corresponding to the TEIDs 51, 53 illustrated in FIG. 2).

An IP flow with FPI=1, 2 are scheduled to the NG3 tunnel of #leg 1. An IP flow with FPI=3 is scheduled to the NG3 tunnel of #leg 2.

In addition, the DRBs and the FPIs are associated with each other one-to-one in the present embodiment. Specifically, as illustrated in FIG. 3, a DRB 1 is associated with FPI=1, a DRB 2 with FPI=2, and a DRB 3 with FPI=3. Note that the DRBs 1 to 3 are data radio bearers (MCG bearer or SCG bearer) established via either one of the MeNB 210 and the SeNB 220.

(3) Functional Block Configuration of Radio Communication System

Next, descriptions will be provided for the functional block configuration of the radio communication system 10. Specifically, the functional block configurations of the MeNB 210, the SeNB 220, and the CN-UP 300 will be described.

(3.1) MeNB 210

Figure 4:
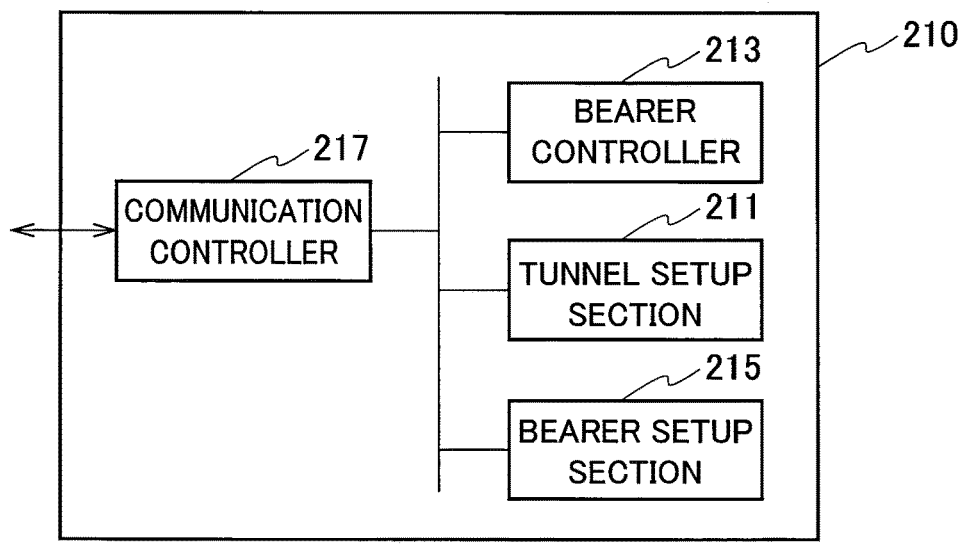
FIG. 4 is a functional block configuration diagram of an MeNB 210.

FIG. 4 is a functional block configuration diagram of the MeNB 210. As illustrated in FIG. 4, the MeNB 210 includes a tunnel setup section 211, a bearer controller 213, a bearer setup section 215, and a communication controller 217.

The tunnel setup section 211 establishes the PDN tunnel 41 (see FIG. 2). Specifically, the tunnel setup section 211 establishes the PDN tunnel 41 having the TEID 51 and the TEID 52 based on a request from the bearer controller 213.

The bearer controller 213 controls establishing and releasing a bearer that is established via the MeNB 210 and the SeNB 220. Specifically, the bearer controller 213 receives a request of establishing a bearer (EPS bearer) from the CN-CP 400. Based on the setup request, the bearer controller 213 transmits a bearer setup instruction to the CN-CP 400.

To be more specific, the bearer controller 213 receives an E-RAB setup request (setup request) and transmits an E-RAB setup response (bearer setup instruction). The E-RAB setup response indicates the setup of the EPS bearer using the PDN tunnel 41 and the PDN tunnel 42 and includes Bearer IDs and TEIDs.

In addition, the bearer controller 213 controls setup of the EPS bearer that passes through the SeNB 220. Specifically, the bearer controller 213 determines the TEID 53 and the TEID 54 of the PDN tunnel 42 and instructs the SeNB 220 to use the PDN tunnel 42 to establish the S1 bearer and the DRB (SCG bearer).

The bearer setup section 215 establishes the EPS bearer passing through the MeNB 210 based on the control by the bearer controller 213.

Specifically, the bearer setup section 215 establishes the S1 bearer by using the PDN tunnel 41. Further, the bearer setup section 215 establishes the EPS bearer including the DRB (MCG bearer) and the established S1 bearer.

As described above, the bearer setup section 215 sets the same identifiers to the DRB and the S1 bearer. Specifically, the bearer setup section 215 sets the same identifiers (aaa) to the Bearer ID of the established EPS bearer.

The communication controller 217 controls communications between the MeNB 210 and the CN-UP 300. Specifically, based on the instructions from the tunnel setup section 211 and the bearer setup section 215, the communication controller 217 performs setup of the PDN tunnel 41 and the EPS bearer using the PDN tunnel 41, and control of the IP flows that passed through the bearer.

In addition, the communication controller 217 controls the communications of the SeNB 220. Specifically, based on the instruction from the bearer controller 213, the communication controller 217 controls the SeNB 220 for the setup of the PDN tunnel 42 and the communications (such as the later-described SeNB addition) required for the setup of the S1 bearer and the DRB (SCG bearer) using the PDN tunnel 42.

(3.2) SeNB 220

Figure 5:
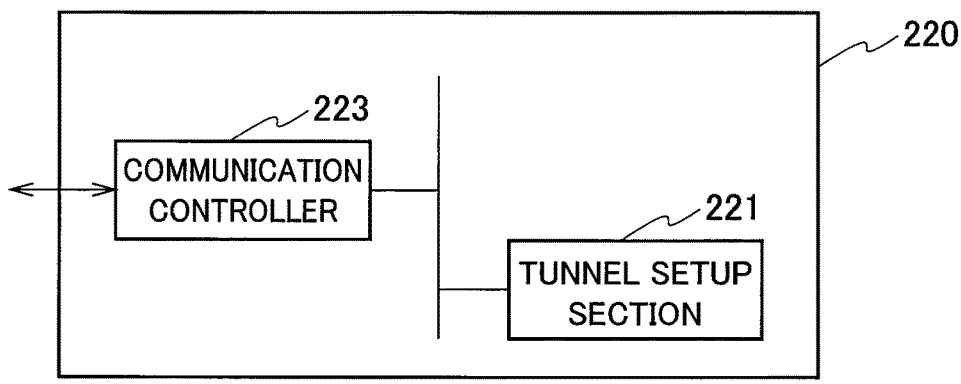
FIG. 5 is a functional block configuration diagram of an SeNB 220.

FIG. 5 is a functional block configuration diagram of the SeNB 220. As illustrated in FIG. 5, the SeNB 220 includes a tunnel setup section 221 and a communication controller 223.

The tunnel setup section 221 establishes the PDN tunnel 42. Specifically, the tunnel setup section 221 establishes the PDN tunnel 42 and also establishes the TEID 53 and the TEID 54 based on the instruction from the MeNB 210.

The communication controller 223 controls communications of the SeNB 220 based on the instruction from the MeNB 210. Specifically, the communication controller 223 performs setup of the S1 bearer and the DRB (SCG bearer) using the PDN tunnel 42 and control of the IP flows that passed through the bearer.

(3.3) CN-UP 300

Figure 6:
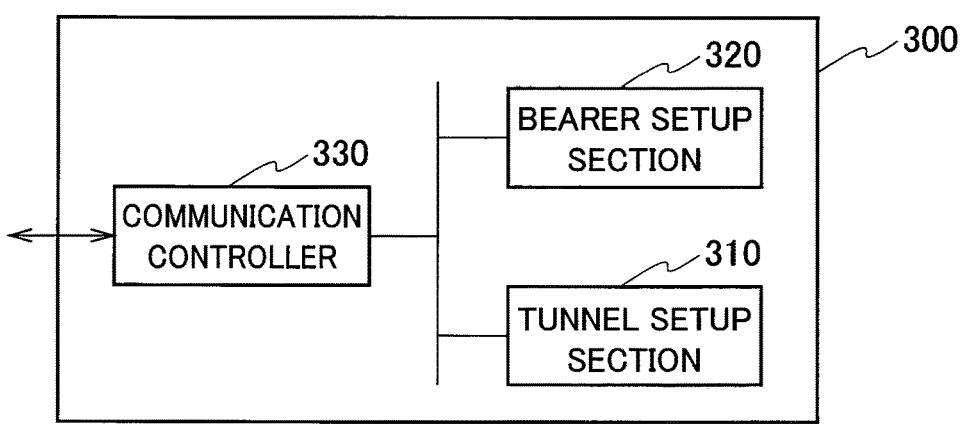
FIG. 6 is a functional block configuration diagram of a CN-UP 300.

FIG. 6 is a functional block configuration diagram of the CN-UP 300. As illustrated in FIG. 6, each CN-UP 300 includes a tunnel setup section 310, a bearer setup section 320, and a communication controller 330. As illustrated in FIG. 2, each CN-UP 300 may include a function (device) that corresponds to the SGW or the PGW. Otherwise, a CN-UP 300 may implement the function corresponding to the SGW and the PGW as one device.

The tunnel setup section 310 establishes the PDN tunnel 41 and the PDN tunnel 42. In addition, the CN-UP 300 establishes the PDN tunnel 30 between the CN-UP 300 (SGW) and the CN-UP 300 (PGW). Note that, in a case where the function corresponding to the SGW and the PGW is implemented in one device, the PDN tunnel 30 does not need to be established.

Specifically, the tunnel setup section 310 establishes the PDN tunnel 41 (first tunnel) and the PDN tunnel 42 (second tunnel) based on a Session Modification Request (bearer setup instruction) transmitted from the CN-CP 400. In the present embodiment, the bearer setup instruction is comparable to the E-RAB setup response, which is transmitted by the MeNB 210, and the Session Modification Request, which is transmitted by the CN-CP 400.

The tunnel setup section 310 sets the same identifiers (TEID=1) to the TEID 51, which is the TEID (first tunnel endpoint identifier) on the CN-UP 300 side of the PDN tunnel 41, and the TEID 53, which is the TEID (second tunnel endpoint identifier) on the CN-UP 300 side of the PDN tunnel 42.

The bearer setup section 320 establishes the EPS bearer based on the instructions from the MeNB 210 and the CN-CP 400. Specifically, the bearer setup section 320 establishes the EPS bearer including the PDN tunnel 41 and the PDN tunnel 42. As described above, the bearer setup section 320 sets the same identifiers (aaa) to the Bearer ID of the EPS bearer.

The communication controller 330 controls communications between the MeNB 210 and the CN-UP 300, communications between the SeNB 220 and the CN-UP 300, and communications between the CN-UP 300 (SGW) and the CN-UP 300 (PGW).

Specifically, the communication controller 330 respectively schedules IP flows with different FPIs (flow priority identifiers) to the PDN tunnel 41 and the PDN tunnel 42. Specifically, the communication controller 330 schedules the IP flows in the downlink direction to the PDN tunnel 41 and the PDN tunnel 42, the IP flows being received through the S5/S8 bearer using the PDN tunnel 30.

Note that, when the function comparable to the SGW and the PGW is implemented as one device, the communication controller 330 schedules the received IP flows in the downlink direction to the PDN tunnel 41 or the PDN tunnel 42 without letting the IP flows pass through the S5/S8 bearer using the PDN tunnel 30.

To be more specific, the communication controller 330 schedules the IP flow 61 to which FPI=1 is assigned to the S1 bearer using the PDN tunnel 41. Further, the communication controller 330 schedules the IP flow 62 to which FPI=2 is assigned to the S1 bearer using the PDN tunnel 42.

Note that the communication controller 330 schedules also an IP flow to which another FPI is assigned to either one of the PDN tunnel 41 and the PDN tunnel 42.

(4) Operation of Radio Communication System

Next, descriptions will be provided for operation of the above-described radio communication system 10. Specifically, descriptions will be provided for operation of the radio communication system 10 related to setup of the EPS bearer (NGS bearer), addition of the PDN tunnels, and release of the PDN tunnels.

(4.1) Basic Sequence

Figure 7:
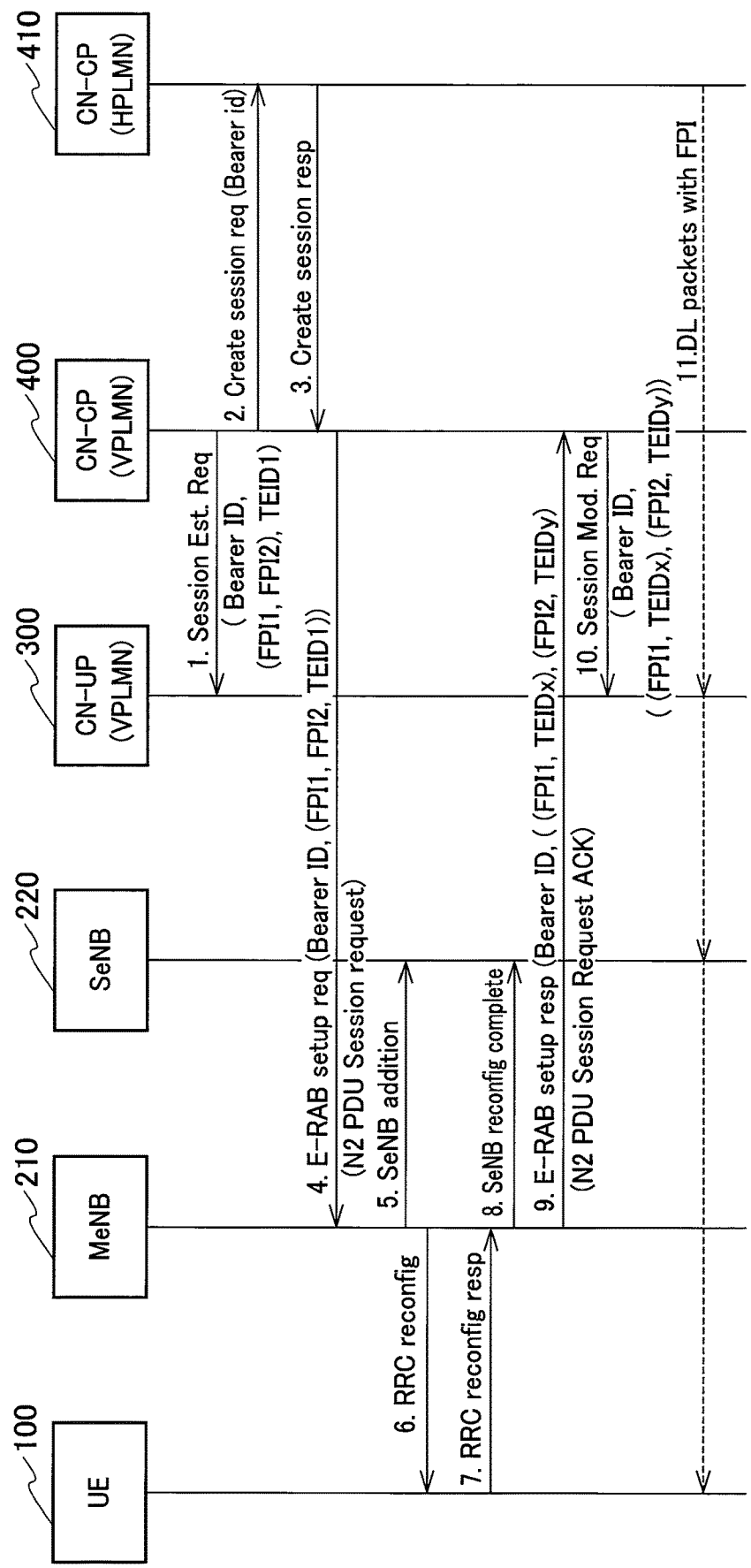
FIG. 7 is a diagram illustrating a basic sequence for establishing an EPS bearer (NGS bearer) in the radio communication system 10.

FIG. 7 is a diagram illustrating a basic sequence for establishing the EPS bearer (NGS bearer) in the radio communication system 10. The basic sequence illustrated in FIG. 7 is based on a control plane (C plane). "Based on the C plane" means that a radio base station (MeNB 210) starts setup operation with a message on the C plane as a trigger.

The basic sequence is applied in the state where no PDN tunnel such as attach of the UE 100 to the radio access network is established.

As illustrated in FIG. 7, the CN-CP 400 provided in the VPLMN transmits a Session Establishment Request to the CN-UP 300 and also transmits a Create Session Request to the CN-CP 410 provided in the HPLMN, and thereby establishing a session (S1 to S3).

Here, the Session Establishment Request includes: information that indicates the necessity of establishing the EPS bearer (E-RAB) corresponding to multiple FPIs (FPI=1, 2); the TEID value (TEID=1) of the PDN tunnel on the CN-UP 300 side; and the ID (Bearer ID=aaa) of the EPS bearer. In addition, the Create Session Request also includes the Bearer ID.

Note that the specific setup contents of the FPIs are determined by referring to a subscriber profile of the UE 100, for example.

The CN-CP 400 transmits the E-RAB setup request to the MeNB 210 and performs setup required for performing the Dual Connectivity (DC) with the SeNB 220 (S4 to S8). Note that the E-RAB setup request may be called an N2 PDU session request.

Specifically, the CN-CP 400 requests setup of the same Bearer IDs (Bearer ID=aaa) to the EPS bearer by using the E-RAB setup request. In addition, the CN-CP 400 notifies the MeNB 210 of the existence of the multiple FPIs (FPI=1, 2) and the value of the TEID (TEID=1) set for the PDN tunnel on the CN-UP 300 side, by using the E-RAB setup request.

Based on the E-RAB setup request, the MeNB 210 establishes the DRBs, which correspond to the IP flow 61 with FPI=1 (see FIG. 2) and the IP flow 62 with FPI=2, in the sequence S5 to S8. Specifically, the MeNB 210 establishes the MCG bearer to which the IP flow 61 is scheduled and the SCG bearer to which the IP flow 62 is allocated. In addition, the MeNB 210 establishes the S1 bearers by using the PDN tunnel 41 (see FIG. 2) and the PDN 42.

Once the above-described setup is completed, the MeNB 210 transmits the E-RAB setup response to the CN-CP 400 (S9). The E-RAB setup response includes the Bearer ID of the EPS bearer, the value of the TEID 52 (TEID=x) to which the IP flow 61 with FPI=1 is scheduled, and the value of the TEID 54 (TEID=y) to which the IP flow 62 with FPI=2 is scheduled. Note that the E-RAB setup response may be called an N2 PDU session request ACK (same as below).

The CN-CP 400 transmits the Session Modification Request to the CN-UP 300 based on the received E-RAB setup response (S10). As with the E-RAB setup response, the Session Modification Request includes the Bearer ID and the TEIDs (x, y).

The CN-UP 300 establishes the EPS bearer based on the received Session Modification Request. Specifically, the CN-UP 300 establishes the EPS bearer by using the PDN tunnel 41 and the PDN tunnel 42. The EPS bearer includes the DRBs, the S1 bearers, and the S5/S8 bearer as described above, and the same Bearer IDs (aaa) are set for the EPS bearer.

As a result, the EPS bearer using the PDN tunnels as illustrated in FIG. 2 is established, and the IP packets in the downlink direction as the IP flows are transmitted to the UE 100 through the EPS bearer.

(4.2) Addition of Tunnel

Next, descriptions will be provided for a sequence for adding a PDN tunnel in the state in which the EPS bearer is established.

Specifically, descriptions will be provided for a sequence for further adding a PDN tunnel for a new FPI (FPI=3) between the SeNB 220 and the CN-UP 300 in the state in which the EPS bearer is established. This sequence is also based on the control plane (C plane).

(4.2.1) Addition Led by Core Network

Figure 8:
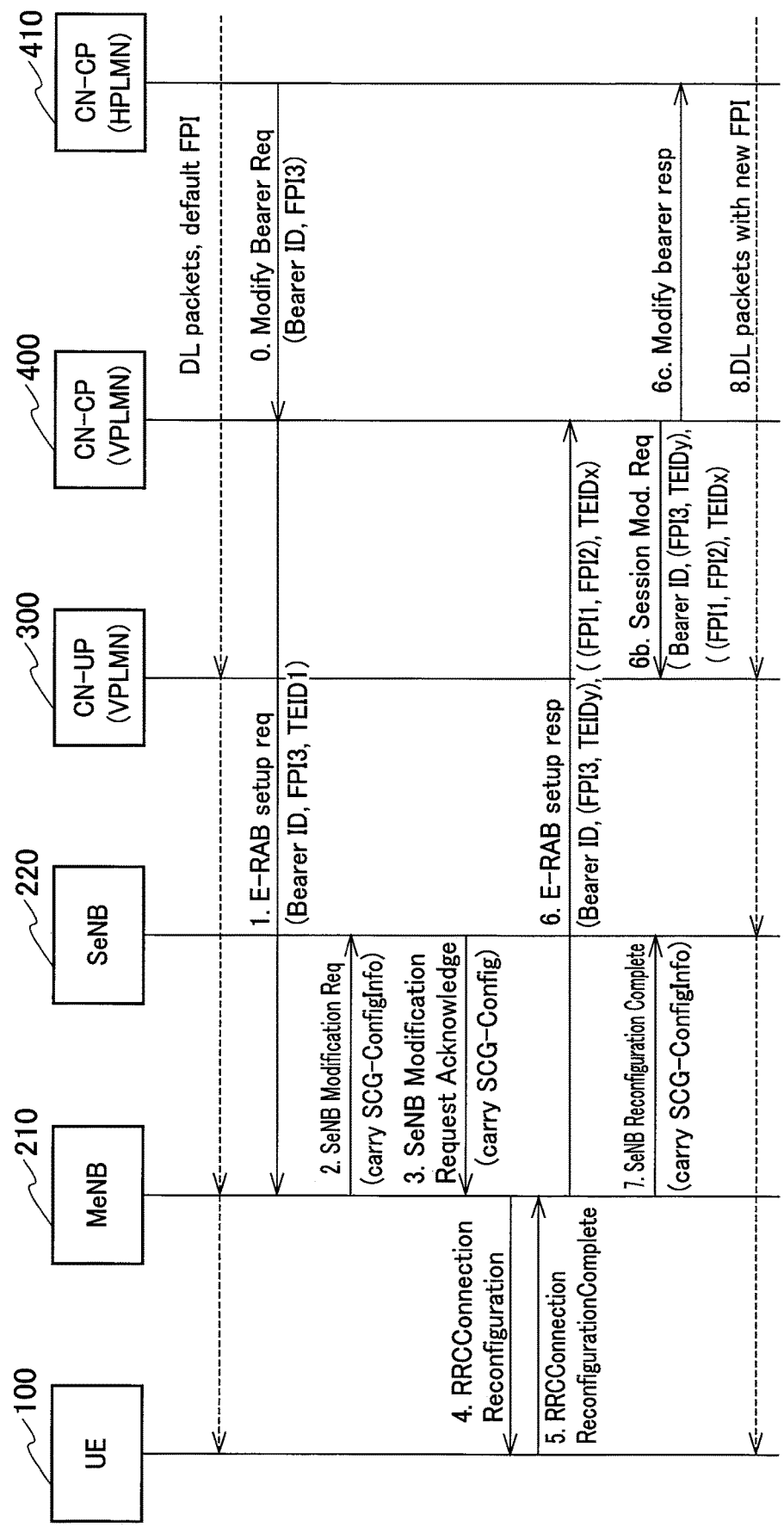
FIG. 8 is a diagram illustrating a sequence for adding a PDN tunnel (second tunnel) under the lead of the core network.

FIG. 8 is a diagram illustrating a sequence for adding a PDN tunnel under the lead of the core network. As illustrated in FIG. 8, the CN-CP 400 receives a Modify Bearer Request from the CN-CP 410 and transmits the E-RAB setup request to the MeNB 210 (S0, S1). The Modify Bearer Request and the E-RAB setup request include the Bearer ID (aaa) and the value of TEID (TEID=1) on the CN-UP 300 side of the PDN tunnel to which an IP flow with FPI=3 is scheduled.

Based on the received E-RAB setup request, the MeNB 210 establishes the PDN tunnel to which the IP flow is scheduled (S2 to S5).

Here, in the state where the IP flow with FPI=1, 2 is scheduled in the PDN tunnel 41 (in which the TEID on the MeNB 210 side=x) terminated to the MeNB 210, the MeNB 210 newly establishes the PDN tunnel 42 (in which the TEID of the SeNB 220=y) terminated to the SeNB 220, and determines to schedule the IP flow with FPI=3 to the PDN tunnel 42.

As described above, the MeNB 210 is capable of determining correspondence between a PDN tunnel and an FPI, that is, determining whether to use the DRB and the S1 bearer that pass through the SeNB 220. Note that, until the determination of correspondence between the PDN tunnel and the IP flow with FPI=3 is made, when receiving the IP flow with FPI=3, the CN-UP 300 may schedule the IP flow to the default DRB (such as the MCG bearer) and the S1 bearer that are designated in advance.

The MeNB 210 performs processing that is substantially the same as the basic sequence illustrated in FIG. 7, and transmits the E-RAB setup response to the CN-CP 400 (S6). Thereafter, as with the basic sequence, the Session Modification Request is transmitted to the CN-UP 300. Then, based on the correspondence between the new PDN tunnel (PDN tunnel 42) and the FPI (FPI=3), the IP packets in the downlink direction are transmitted as an IP flow to the UE 100 (S6b, 6c, and S8).

(4.2.2) Addition Led by Radio Access Network

Figure 9:
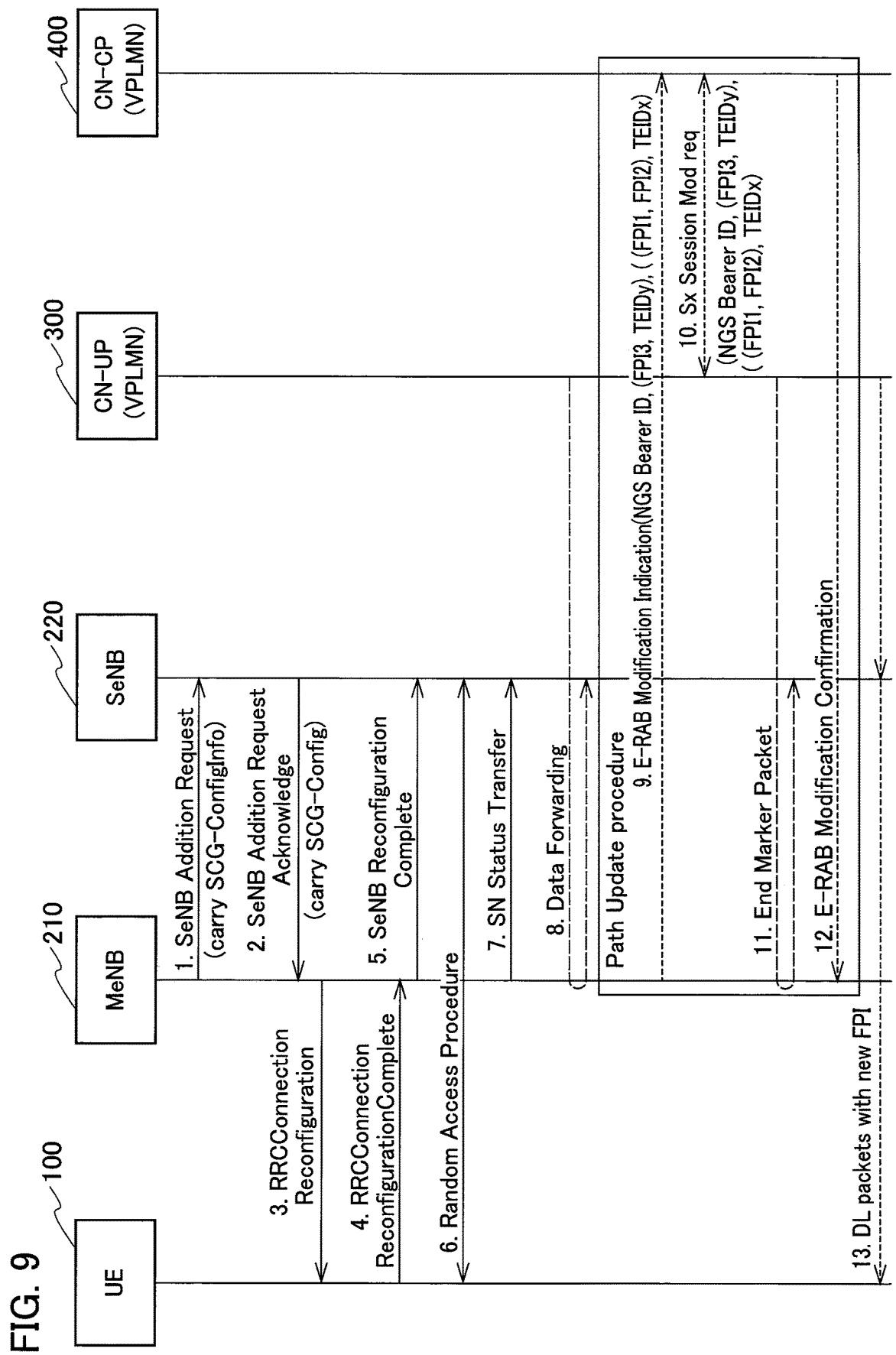
FIG. 9 is a diagram illustrating a sequence for adding a PDN tunnel (second tunnel) under the lead of a radio access network.

FIG. 9 illustrates a sequence for adding a PDN tunnel under the lead of the radio access network. In this sequence, the radio access network, which is specifically the MeNB 210, detects the necessity of scheduling the IP flow with FPI=3 and adds a PDN tunnel for the new FPI (FPI=3). Here, determination is made that the PDN tunnel 42 (in which the TEID of the SeNB 220=y) terminated to the SeNB 220 is newly established, and the IP flow with FPI=3 is scheduled to the PDN tunnel 42.

As illustrated in FIG. 9, the MeNB 210 performs establishment of the DRB (SCG bearer) passing through the SeNB 220, the PDN tunnel 42, and the S1 bearer using the PDN tunnel 42 (S1 to S7). Specifically, the MeNB 210 performs transmission and reception of commands with the UE 100 and the SeNB 220 in order to allow the UE 100 to perform the Dual Connectivity (DC).

To be more specific, the MeNB 210 performs transmission and reception of commands related to addition of the SeNB 220 with the SeNB 220 (S1, S2, S5, S7), and also performs transmission and reception of commands in a radio resource control (RRC) layer with the UE 100 in order to perform the DC (S3, S4).

In addition, the UE 100 performs a random access (RA) procedure with the SeNB 220 based on the control by the MeNB 210 (S6).

Once the sequence up to S7 is completed, the MeNB 210 forwards the IP flow with FPI=3 to the SeNB 220 (S8).

The SeNB 220 establishes the PDN tunnel 42 and the S1 bearer using the PDN tunnel 42 based on an existing Path Update procedure (in the frame in FIG. 9) (S9 to S12). Note that the E-RAB Modification Indication/Confirmation may be called different names using the designation of PDU session.

Once the sequence up to S12 is completed, IP packets in the downlink direction are transmitted as an IP flow to the UE 100 based on the correspondence between the new PDN tunnel (PDN tunnel 42) and the FPI (FPI=3) (S13).

Note that, since the TEID on the CN-UP 300 side is kept, the E-RAB Modification Confirmation need not include the TEID (TEID=1) on the CN-UP 300 side.

(4.3) Release of Tunnel

Next, descriptions will be provided for a sequence for releasing a PDN tunnel in the state where the EPS bearer is set.

Specifically, descriptions will be provided for a sequence for releasing the PDN tunnel (PDN tunnel 42), which is for FPI=3 and established between the SeNB 220 and the CN-UP 300, and combining the IP flow with FPI=3 with the PDN tunnel (PDN tunnel 41) for FPI=1, 2. This sequence is also based on the control plane (C plane).

(4.3.1) Release Led by Radio Access Network

Figure 10:
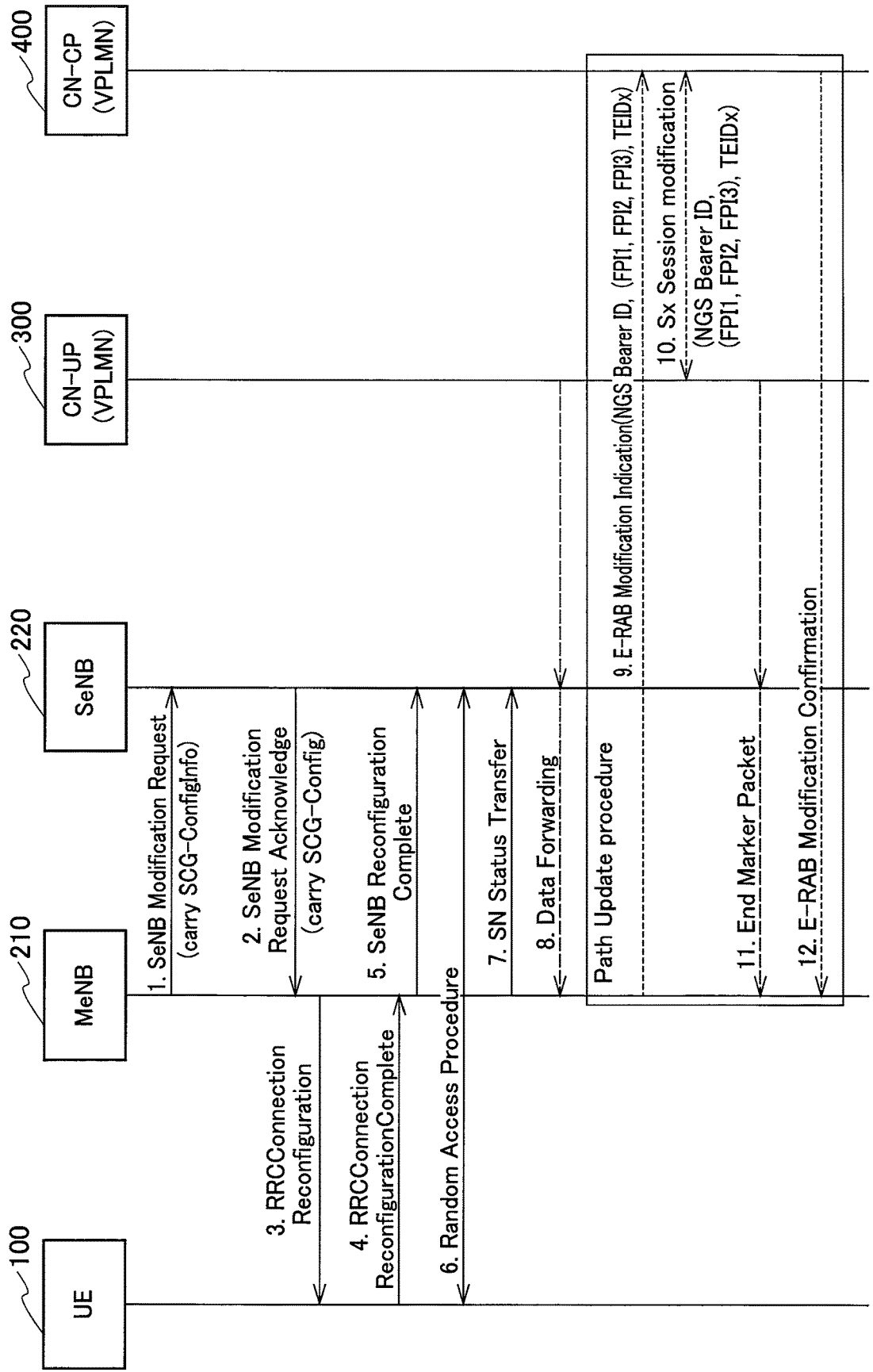
FIG. 10 is a diagram illustrating a sequence for releasing a PDN tunnel (second tunnel) under the lead of the radio access network.

FIG. 10 illustrates a sequence for releasing a PDN tunnel under the lead of the radio access network. The sequence illustrated in FIG. 10 is similar to the sequence for adding a PDN tunnel illustrated in FIG. 9. Since the sequence illustrated in FIG. 10 is for releasing a PDN tunnel, an SeNB Modification Request/SeNB Modification Request Acknowledge is transmitted and received instead of the SeNB Addition Request/SeNB Addition Request Acknowledge.

As described above, although the commands transmitted and received by the devices are the same as those in the sequence for adding a PDN tunnel, in this sequence, the Dual Connectivity (DC) is stopped by cancelling the SeNB 220 (S1 to S7). After performing Data Forwarding from the SeNB 220 to the MeNB 210 for a while (S8), this Data Forwarding is stopped by forwarding an End Marker Packet (S11).

In addition, contents of the commands are different from those in the sequence for adding a PDN tunnel, and FIG. 10 illustrates that the IP flows of all the FPIs (FPI=1 to 3) are scheduled to the PDN tunnel in which TRID=x is set, that is, the PDN tunnel 41 (S9, S10).

(4.3.2) Release Led by Core Network

Figure 11:
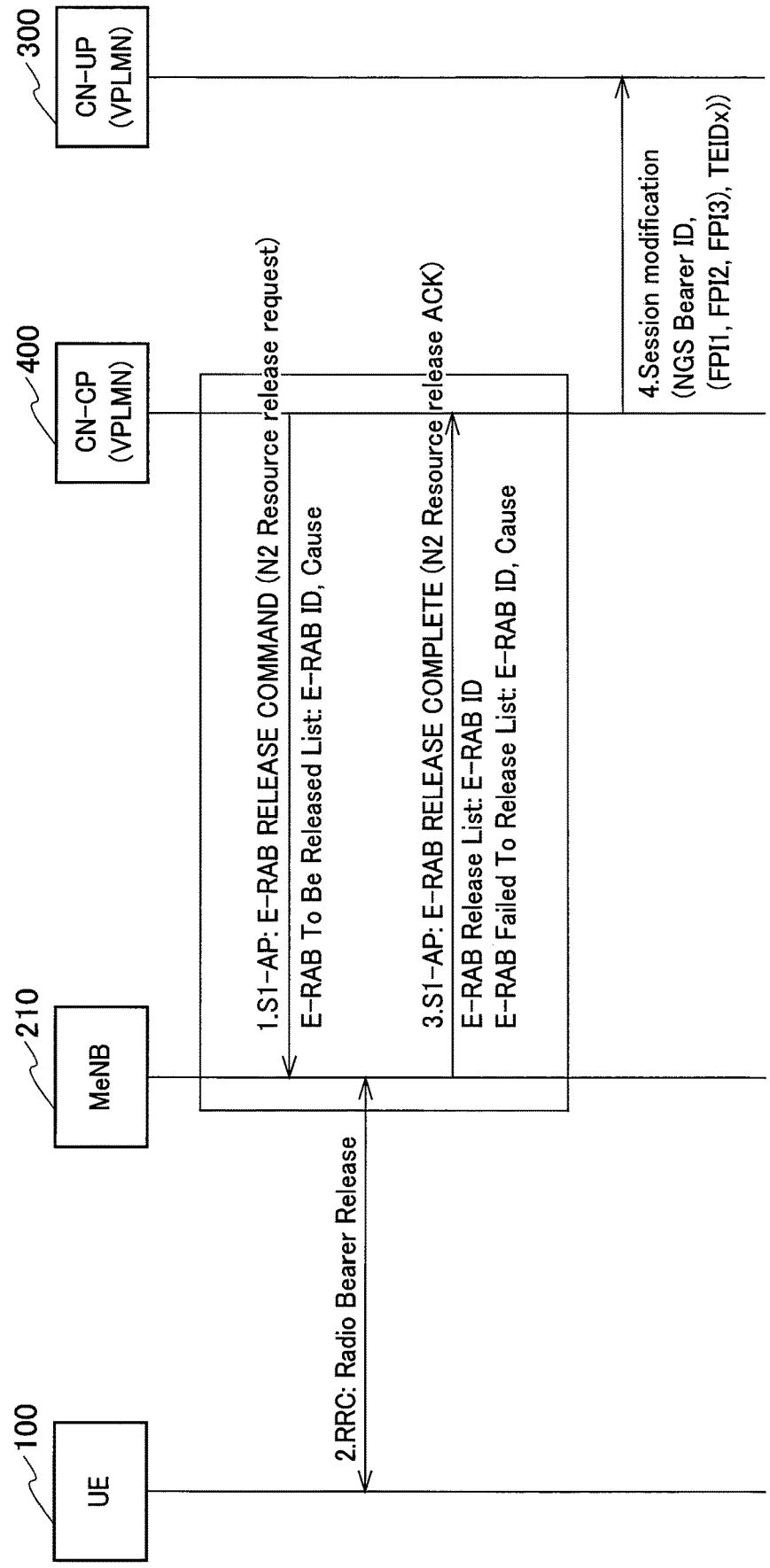
FIG. 11 is a diagram illustrating a sequence for releasing a PDN tunnel (second tunnel) under the lead of the core network.

FIG. 11 illustrates a sequence for releasing a PDN tunnel under the lead of the core network. When releasing a PDN tunnel under the lead of the core network, commands of an S1-AP layer are used (see the frame in FIG. 11).

As illustrated in FIG. 11, the CN-CP 400 requests the MeNB 210 to release the PDN tunnel for FPI=3 (PDN tunnel 42) by using an E-RAB RELEASE COMMAND, which is the command of the S1-AP layer (S1).

The E-RAB RELEASE COMMAND includes an ID (Bearer ID) of a bearer of the PDN tunnel to be released, and a reason of the release. Note that the E-RAB RELEASE COMMAND may be called an N2 Resource release request.

The MeNB 210 performs processing of releasing the DRB (SCG bearer) between the UE 100 and the SeNB 220 (S2) in the RRC layer (S2). Note that, although it is not illustrated, the MeNB 210 performs processing of releasing the DRB (SCG bearer) with the SeNB 220.

In addition, the MeNB 210 transmits an E-RAB RELEASE COMPLETE, which is a command of the S1-AP layer, to the CN-CP 400 (S3).

The E-RAB RELEASE COMPLETE includes the ID (Bearer ID) of the bearer of the released PDN tunnel (at the success and the failure in releasing the PDN tunnel). Also, the E-RAB RELEASE COMPLETE includes a reason of the failure (at the failure in releasing the PDN tunnel). Note that the E-RAB RELEASE COMPLETE may be called an N2 Resource release ACK.

The CN-CP 400 notifies the CN-UP 300 of the release of the PDN tunnel and the combination of the IP flow with FPI=3 with the PDN tunnel (PDN tunnel 41) for FPI=1, 2 (S4). Thereafter, the CN-UP 300 performs release and the like of the PDN tunnel 42 based on the notification.

(4.4) Modification

Although the sequences illustrated in the above-described FIG. 8 and FIG. 9 are based on the control plane (C plane), they may be based on a user plane (U plane) and a PDN tunnel may be added thereto.

Figure 12:
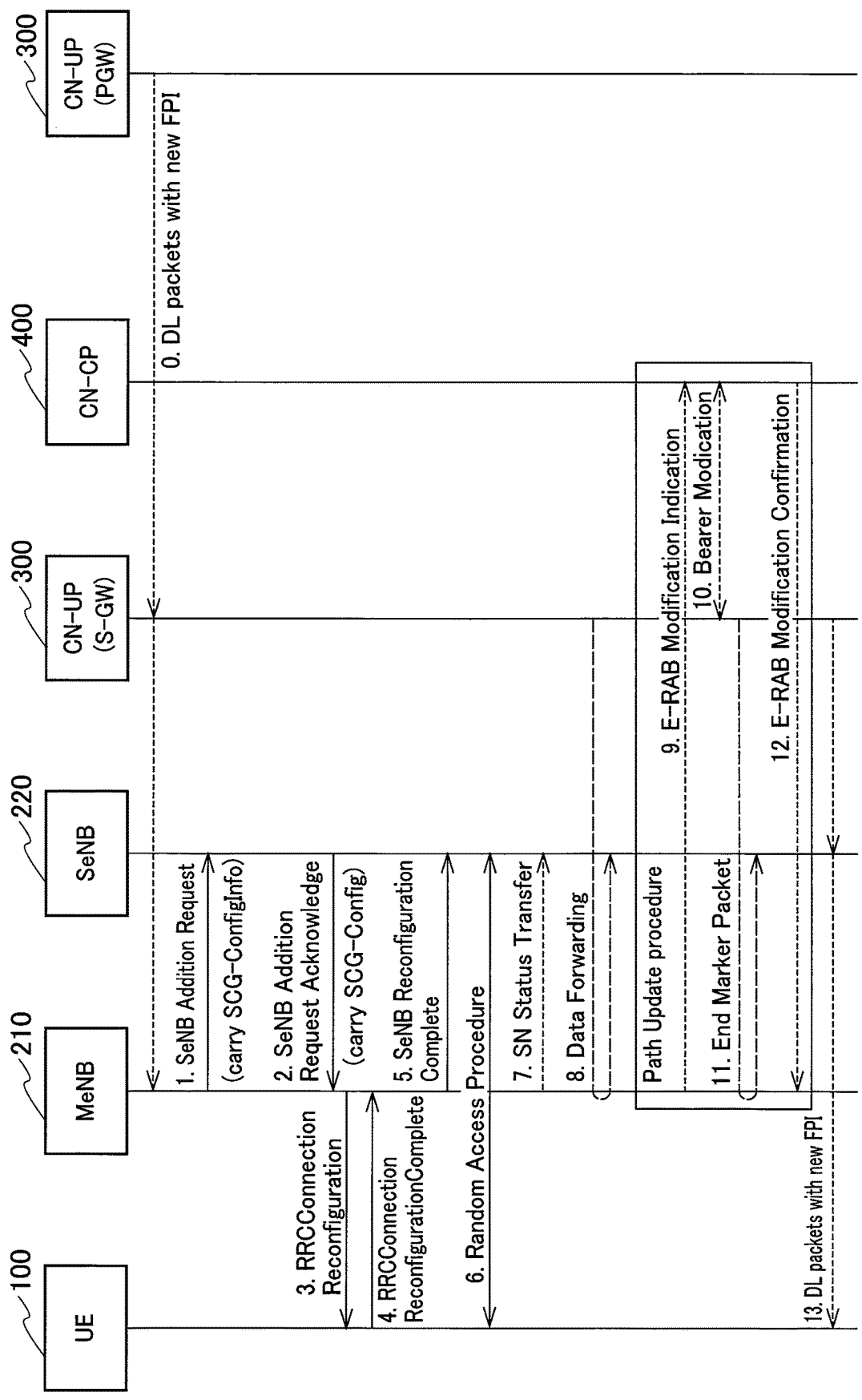
FIG. 12 is a diagram illustrating a sequence (user plane based) for adding a PDN tunnel (second tunnel) under the lead of the core network.

FIG. 12 illustrates a sequence (user plane based) for adding a PDN tunnel under the lead of the core network. As illustrated in FIG. 12, the sequence is started when the MeNB 210 receives packets of the user plane (S0). The sequence of S1 to S8 is the same as the sequence illustrated in FIG. 9, which is for adding a PDN tunnel under the lead of the radio access network.

In addition, although the sequence illustrated in S9 to S12 is the same as that in FIG. 9; contents of the E-RAB Modification Indication and the Bearer Modification are different. With this, a Path Update procedure, that is, addition of a PDN tunnel led by the core network based on the U plane is made.

Specifically, the E-RAB Modification Indication and the Bearer Modification include the FPI (FPI=3) and the TEID of the SeNB 220 of the PDN tunnel 42 to be added.

(5) Advantageous Effect

According to the embodiments described above, the following advantageous effect can be obtained. Specifically, based on the setup request (for example, the E-RAB setup request) of the bearer (EPS bearer), the bearer controller 213 of the MeNB 210 transmits the bearer setup instruction (E-RAB setup response), which is for setting the EPS bearer (NGS bearer) using the PDN tunnel 41 and the PDN tunnel 42, to the CN-CP 400. Then, the CN-CP 400 transmits the Session Modification Request (bearer setup instruction) to the CN-UP 300 based on the E-RAB setup response.

In addition, the tunnel setup section 310 of the CN-UP 300 establishes the PDN tunnel 41 and the PDN tunnel 42 based on the bearer setup instruction. At that time, the tunnel setup section 310 sets the same identifiers (TEID=1) to the TEID 51 (first tunnel endpoint identifier) on the CN-UP 300 (network device) side of the PDN tunnel 41, and the TEID 53 (second tunnel endpoint identifier) on the CN-UP 300 side of the PDN tunnel 42.

Thus, as in the present embodiment, even in the case where the IP flow-based QoS control is introduced and, unlike the conventional bearer-based QoS control, no one-to-one correspondence between a data radio bearer (DRB) and core network bearers (S1 bearers and S5/S8 bearer) exists, the same values are set as the TEID 51 and the TEID 53 on the CN-UP 300 side. With this, even when it is unclear whether the Dual Connectivity (DC) starts, the CN-CP 400 can effectively notify the MeNB 210 of the value of the TEID 53 of the PDN tunnel 42 set for the SeNB 220.

In other words, according to the radio communication system 10, no additional procedure for notifying the MeNB 210 of the value of the TEID 53 is needed, whereby the sequence never becomes complicated even when performing the DC. In other words, according to the radio communication system 10, even with the flow-based QoS control, the DC can be implemented without complicating the sequence.

In the present embodiment, the bearer setup section 215 of the MeNB 210 sets the same identifiers to the data radio bearer (DRB) and the core network bearers (S1 bearers and S5/S8 bearer). In other words, the single identifier (Bearer ID=aaa) is set to the EPS bearer, which includes the DRBs, S1 bearers, and the S5/S8 bearer.

Thus, as with the above-described TEID, even when it is unclear whether the Dual Connectivity (DC) starts, the CN-CP 400 can effectively notify the MeNB 210 of the value of the Bearer ID.

In addition, in the case of applying the flow-based QoS control as in the present embodiment, unlike the conventional bearer-based QoS control, there is no need of the one-to-one correspondence between the data radio bearer (DRB) and the core network bearers (S1 bearers and S5/S8 bearer), and necessity of identifying multiple EPS bearers is low. To be more specific, the necessity of identifying multiple EPS bearers is low in the case of applying the flow-based QoS control because an IP flow is scheduled to the PDN tunnel and the DRBs (MCG bearer and the SCG bearer) associated with the value of the FPI.

In the present embodiment, in the radio communication system 10 (specifically, a range of network including devices managed by the same CN-CPs 400), setting the single identifier (Bearer ID) enables implementing the flow-based QoS control while continuously using the management scheme (such as a sequence for setup/release) of an existing bearer.

In the present embodiment, the communication controller 330 of the CN-UP 300 is capable of respectively scheduling the IP flows having different FPIs to the PDN tunnel 41 and the PDN tunnel 42. For example, the IP flow (IP flow 61) with FPI=1 is scheduled to the PDN tunnel 41 and the IP flow (IP flow 62) with FPI=2 is scheduled to the PDN tunnel 42.

Thus, different PDN tunnels can be used depending on the values of the FPIs. This can increase the possibility of surely processing the IP flow with the high priority.

(6) Other Embodiments

Although the details of the present invention have been disclosed along with the embodiments as above, the present invention is not limited to the above descriptions. It is apparent to those skilled in the art that various modifications and improvements thereto are possible.

For example, in the above-described embodiment, the same values are set as the TEID 51 and the TEID 53 on the CN-UP 300 side and the single identifier (Bearer ID=aaa) is set to the EPS bearer including the DRBs, the S1 bearers, and the S5/S8 bearer. However, among these identifiers, the Bearer ID is not necessarily required to be set as the single identifier. Or alternatively, it is also good that the Bearer ID is set as the single identifier while the TEID 51 and the TEID 53 are not set as the same values.

Although the names such as the CN-CP and the CN-UP are used in the above-described embodiments, they may be called other names; for example, the CN-CP may be called a mobility management entity (MME), and the CN-UP may be called an SGW/a PGW. Depending on the details of functions assignation of the CN-CP and the CN-UP, the CN-CP on the HPLMN side may be replaced with the CN-UP.

In addition, the block diagrams (FIGS. 4 to 6) used for explaining the above embodiments illustrate a functional block diagram. These functional blocks (constituent sections) are implemented by an arbitrary combination of hardware and/or software. In addition, the method of implementing each functional block is not particularly limited. In other words, functional blocks may be implemented either by a single device formed of physical and/or logical combinations, or by multiple devices formed by connecting directly and/or indirectly (for example with wires and/or wirelessly) two or more devices physically and/or logically separated.

Figure 13:
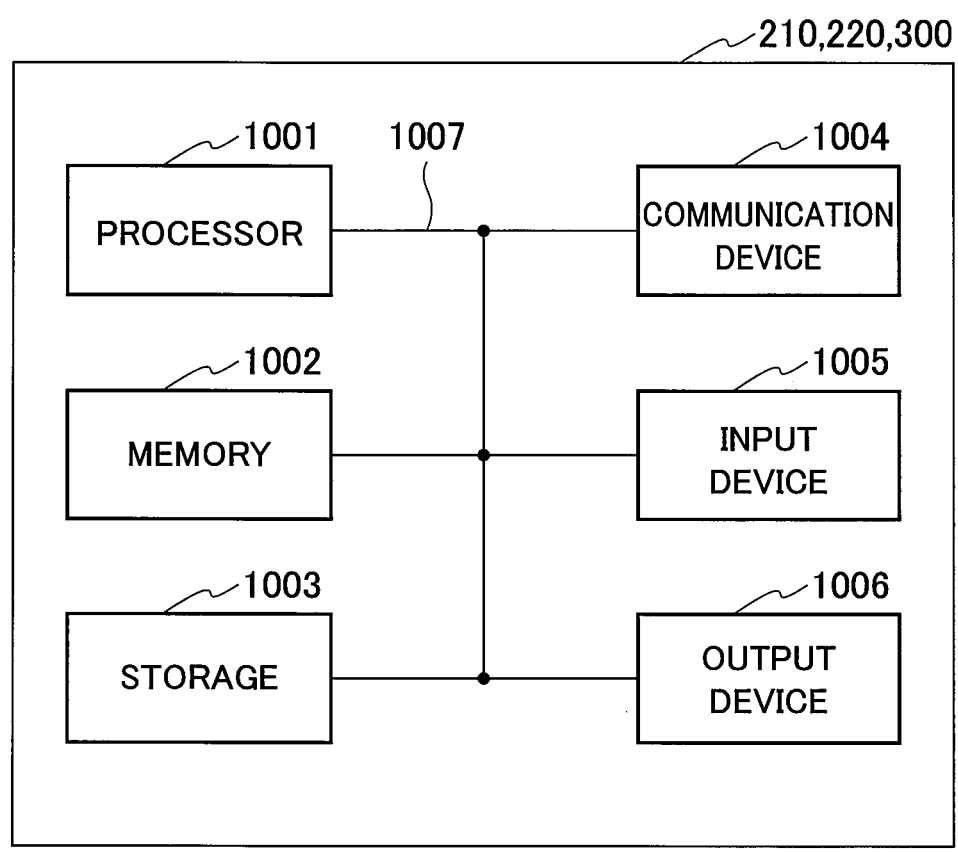
FIG. 13 is a diagram illustrating an example of a hardware structure of the MeNB 210, the SeNB 220, and the CN-UP 300.

Moreover, each of the MeNB 210, the SeNB 220, and the CN-UP 300 described above may function as a computer that performs processing of the radio communication method according to the present invention. FIG. 13 is a diagram illustrating an example of a hardware structure of each of the MeNB 210, the SeNB 220, and the CN-UP 300. As illustrated in FIG. 13, the MeNB 210, the SeNB 220, and the CN-UP 300 may be configured as a computer device including a processor 1001, a memory 1002, a storage 1003, a communication device 1004, an input device 1005, an output device 1006, a bus 1007, and the like.

Each of the functional blocks of the MeNB 210, the SeNB 220, and the CN-UP 300 (see FIGS. 4 to 6) is implemented by a hardware element of any of those computer devices or a combination of the hardware elements.

The processor 1001, for example, controls the entire computer, running an operating system. The processor 1001 may be formed of a central processing unit (CPU) including an interface with peripheral devices, a control device, a computation device, a register, and the like.

The memory 1002 is a computer-readable recording medium, which may be formed of at least one of, for example, ROM (read only memory), EPROM (erasable programmable ROM), EEPROM (electrically erasable programmable ROM), RAM (random access memory), and the like. The memory 1002 may be called a register, a cache, a main memory, or the like. The memory 1002 is capable of storing a program (program codes), and a software module, and the like that can execute a method according to the embodiments described above.

The storage 1003 is a computer-readable recording medium, which may be formed of at least one of, for example, an optical disc such as a CD-ROM (Compact Disc ROM), a hard disk drive, a flexible disk, a magneto-optical disk (for example, a Compact Disc, a Digital Versatile Disc, a Blu-ray (registered trade mark) Disc), a smart card, a flash memory (for example, a card, a stick, a key drive), a floppy (registered trade mark) disk, a magnetic strip, and the like. The storage 1003 may be called an auxiliary storage device. The above described recording medium may be, for example, a database, a server, or another suitable medium including the memory 1002 and/or the storage 1003.

The communication device 1004 is hardware (a transmission reception device) for communication between computers via a wired and/or wireless network, and is also called, for example, a network device, a network controller, a network card, a communication module or the like.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. Note that the input device 1005 and the output device 1006 may be combined into a single unit (for example, a touch panel).

In addition, the devices such as the processor 1001 and the memory 1002 are connected to each other with the bus 1007 to communicate information. The bus 1007 may be formed of a single bus or formed of multiple different buses depending on the devices.

In addition, the method of communicating information is not limited to the embodiments described above, but other methods can be used. For example, the communication of information may be implemented with physical layer signaling (for example, downlink control information (DCI), uplink control information (UCI)), upper layer signaling (for example, RRC signaling, medium access control (MAC) signaling, broadcast information (master information block (MIB)), system information block (SIB)), or other signals, or combinations of these. RRC signaling may be called an RRC message, and may be, for example, an RRC Connection Setup message, an RRC Connection Reconfiguration message, or the like.

Moreover, inputted or outputted information may be stored in a specific location (for example, a memory), or may be managed with a management table. Inputted or outputted information can be overwritten or updated, or additional information can be added to it. Outputted information may be deleted. Inputted information may be transferred to another device.

The sequences, flowcharts, and the like in the embodiments described above may be rearranged in order unless it causes a contradiction.

In addition, a certain operation performed by the MeNB 210, the SeNB 220, and the CN-UP 300 in the above-described embodiments is performed by another network node (device) in some cases. Moreover, the functions of the MeNB 210, the SeNB 220, and the CN-UP 300 may be provided by a combination of other multiple network nodes.

Note that the terms used in the descriptions of this specification and/or terms necessary to understand this specification may be replaced with terms having the same or similar meanings. For example, when there is a description concerned, a channel and/or a symbol may be a signal, or a signal may be a message. In addition, the terms "system" and "network" may be used interchangeably.

Moreover, parameters and the like may be expressed by absolute values, by relative values from specified values, or by other associated information. For example, radio resources may be instructed by an index.

The MeNB 210 and the SeNB 220 (base stations) can accommodate one or more (for example, three) cells (also called sectors). When a base station has multiple cells, the entire coverage area of the base station can be divided into multiple smaller areas. Each smaller area can also provide communication services using a subsystem of the base station (for example, an indoor small base station RRH: remote radio head).

The term "cell" or "sector" means part or the whole of the coverage area provided by a base station and/or a subsystem of the base station that provide communication services in this coverage. Further, the terms "base station", "eNB", "cell", and "sector" can be used interchangeably in this specification. In some cases, a base station is also called terms such as a fixed station, a NodeB, an eNodeB (eNB), an access point, a femtocell, and a small cell.

The UE 100 is also called in some cases by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

"The expression "based on" used in this specification does not mean "based only on" unless explicitly stated otherwise. In other words, the expression "based on" means both "based only on" and "based at least on".

In addition, the terms "including", "comprising", and other variations thereof are intended to be comprehensive as with "comprise". Moreover, the term "or" used in this specification or the scope of claims is intended not to be exclusive disjunction.

Any reference of the elements using names such as "first", "second", and the like used in this specification does not limit the amount or the order of these elements in general. These names can be used in this specification as a convenient way of discriminating two or more elements. Thus, referring to a first element and a second element does not mean that only the two elements can be employed in the specification or that the first element should precede the second element in some form.

In the entirety of this specification, for example, when articles such as a, an, and the in English are added in translation, these articles also mean to include plurality as long as the context does not clearly indicate the singularity.

Although the embodiments of the present invention have been described as above, it should not be understood that the descriptions and the drawings that constitute part of this disclosure limit the present invention. From this disclosure, various alternative embodiments, examples, and operation techniques will be easily found by those skilled in the art.

Note that the entire contents of Japanese Patent Application No. 2016-199102 (filed on Oct. 7, 2016) are incorporated in this specification by reference.

INDUSTRIAL APPLICABILITY

The radio communication system, the network device, and the radio communication method described above make it possible to implement Dual Connectivity (DC) without complicating the sequence even with a flow-based QoS control.

REFERENCE SIGNS LIST 10 radio communication system
20 external network
30 PDN tunnel
41, 42 PDN tunnel
51 to 54 TEID
61, 62 IP flow
100 UE
210 MeNB
211 tunnel setup section
213 bearer setup instruction section
215 bearer setup section
217 communication controller
220 SeNB
221 tunnel setup section
223 communication controller
300 CN-UP
310 tunnel setup section
320 bearer setup section
330 communication controller
400, 410 CN-CP
1001 processor
1002 memory
1003 storage
1004 communication device
1005 input device
1006 output device
1007 bus

The invention claimed is:

1. A radio communication system comprising:
a master radio base station configured to perform radio communications with user device and control radio communications between the user device and a secondary radio base station; and
a network device configured to establish a PDU session that includes a first tunnel to the master radio base station and a second tunnel to the secondary radio base station, wherein
the master radio base station includes a controller that receives a setup request of the PDU session and, based on the setup request, transmits a setup instruction to establish the PDU session using the first tunnel and the second tunnel,
the network device includes a tunnel setup section that sets same identifiers to a first tunnel endpoint identifier on a network device side of the first tunnel and a second tunnel endpoint identifier on a network device side of the second tunnel.

2. The radio communication system according to claim 1, wherein
the PDU session includes at least
data radio bearers established between the user device and the master radio base station, and between the user device and the secondary radio base station, and
core network bearers established between the master radio base station and the network device, and between the secondary radio base station and the network device, and
the master radio base station includes a bearer setup section that sets same identifiers to the data radio bearers and the core network bearers.

3. The radio communication system according to claim 1, wherein
priority control which uses a flow priority identifier that indicates a degree of priority of each IP flow transmitted via the PDU session is performed in the radio communication system, and
the network device includes a communication controller that schedules IP flows with the different flow priority identifiers to the first tunnel and the second tunnel, respectively.

4. A network device configured to perform radio communications with user device and establish a PDU session that includes a first tunnel to a master radio base station which controls radio communications between the user device and a secondary radio base station, and a second tunnel to the secondary radio base station, the network device comprising:
a transceiver that receives a setup instruction to establish the PDU session using the first tunnel and the second tunnel; and
a processor, coupled to the transceiver, that sets same identifiers to a first tunnel endpoint identifier on a network device side of the first tunnel and a second tunnel endpoint identifier on a network device side of the second tunnel based on the setup instruction.

5. A radio communication method to be executed by using a master radio base station that performs radio communications with user device and controls radio communications between the user device and a secondary radio base station, and a network device that establishes a PDU session that includes a first tunnel to the master radio base station and a second tunnel to the secondary radio base station, the method comprising the steps of:
receiving a setup request of the PDU session and, based on the setup request, transmitting a setup instruction to establish the PDU session using the first tunnel and the second tunnel, by the master radio base station, and
setting, by the network device, same identifiers to a first tunnel endpoint identifier on a network device side of the first tunnel and a second tunnel endpoint identifier on a network device side of the second tunnel based on the setup instruction.

\* \* \* \* \*